(12) United States Patent
Ma et al.

(10) Patent No.: US 7,590,521 B2
(45) Date of Patent: Sep. 15, 2009

(54) METHOD AND SYSTEM FOR PROBE OPTIMIZATION WHILE INSTRUMENTING A PROGRAM

(75) Inventors: Kenneth Kai-Baun Ma, Sammamish, WA (US); Stephen Craig Schertz, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 601 days.

(21) Appl. No.: 10/819,463

(22) Filed: Apr. 7, 2004

(65) Prior Publication Data
US 2005/0229165 A1 Oct. 13, 2005

(51) Int. Cl.
G06F 9/45 (2006.01)
(52) U.S. Cl. .................. 703/22; 703/1; 703/6; 717/154
(58) Field of Classification Search ................. 717/130, 717/154; 703/1, 6, 22
See application file for complete search history.

(56) References Cited

U.S. PATENT DOCUMENTS

| | | | | |
|---|---|---|---|---|
| 5,613,118 | A | * | 3/1997 | Heisch et al. ............... 717/158 |
| 5,689,712 | A | * | 11/1997 | Heisch ....................... 717/130 |
| 5,790,858 | A | * | 8/1998 | Vogel ......................... 717/130 |
| 5,940,618 | A | * | 8/1999 | Blandy et al. .............. 717/128 |
| 6,643,842 | B2 | * | 11/2003 | Angel et al. ................ 717/130 |
| 7,051,034 | B1 | * | 5/2006 | Ghosh et al. ............... 707/100 |
| 7,240,335 | B2 | * | 7/2007 | Angel et al. ................ 717/130 |
| 2007/0083856 | A1 | * | 4/2007 | Chilimbi et al. ............ 717/128 |

OTHER PUBLICATIONS

A. Goel et al., "Probe Mechanism for Object-Oriented Software Testing", IEE, 6th International Conference Fundamental Approaches to Software Engineering, pp. 310-324, Apr. 7-11, 2003.
F. Freitag et al., "On the Scalability of Tracing Mechanisms", IEE, 8th International Euro-Par Conference, Parallel Processing, pp. 97-104, Aug. 27-30, 2002.
Agrawal; "*Dominators, Super Blocks, and Program Coverage*"; Jan. 17, 1994; pp. 25-34.
Tikir et al.; "*Efficient Instrumentation for Code Coverage Testing*"; Jul. 4, 2002; pp. 86-96.
Agrawal; "*Efficient Coverage Testing Using Global Dominator Graphs*"; Sep., 1999; pp. 11-20.
Tarjan; "*Fast Algorithms for Solving Path Problems*"; Jul. 3, 1981; pp. 594-614.
European Search Report dated May 7, 2008 in EP 05102628.4.

* cited by examiner

*Primary Examiner*—Kamini S Shah
*Assistant Examiner*—Herng-der Day
(74) *Attorney, Agent, or Firm*—Merchant & Gould, P.C.

(57) ABSTRACT

A method and system is provided for instrumenting a program by optimizing probe insertion. The number of probe insertions into instrumented code is reduced by providing optimal probe insertion points. The control flow of the code is analyzed along with the arc and block relationships to build a post-dominator tree. An optimization map is generated from the post-dominator tree that provides the optimal probe insertion points. Once the probes are inserted and data is collected by running the binary representing the code and probes, the data may be overlaid onto the optimization map and arc and block relationships to provide code coverage data.

13 Claims, 5 Drawing Sheets

METHOD AND SYSTEM FOR PROBE OPTIMIZATION WHILE INSTRUMENTING A PROGRAM

BACKGROUND OF THE INVENTION

Coverage analysis is method adopted by many software developers for ensuring consistent, high-quality verification results. Code coverage analysis tools may be installed to provide the coverage analysis for a particular program. Coverage analysis tools may vary in scope and method for obtaining coverage information.

Essentially, coverage analysis is based on the measurement of a design's test suite against a set of objective metrics. Designers will choose metrics based on the stage of their design, the cost of making the coverage measurement and a design group's experience with the usefulness of a particular metric. Code coverage metrics are often the first to be employed because they can be implemented at relatively low cost with automated tools and provide straightforward results.

One method of code coverage instrumentation involves placing "probes" at each block or arc within the logical flow of a program's code. The "probes" refer to a set of instructions that records data about the code. For example, a probe may report out the usage data of a particular portion of the program for analysis. Placing probes in the program provides a powerful method for instrumenting a program.

Performance is a concern in any cases where a user needs to augment code to collect additional data. The overhead imposed by the instrumentation/probes may outweigh the benefits of the code coverage analysis. The performance cost of the probe-based analysis may be significant due to the level of coverage data provided. What is needed is method for instrumenting a program that provides a comparable level of data as provided by probe-based analysis while improving performance costs.

SUMMARY OF THE INVENTION

The present invention provides a method and system for instrumenting a program by optimizing probe insertion. Optimizing the probe insertion increases performance of the instrumented code by reducing code coverage data collection overhead. The control flow of the code is analyzed along with the arc and block relationships to build a "post-dominator tree". A post-dominator refers to a relationship between a first section of code and a second section of code. If the first section of code must execute before the second section of code can execute, the second section of code is referred to as the "post-dominator" of the first section of code. Correspondingly, in the same example, the first section of code is referred to as the "dominator" of the second section of code.

With the calculated post-dominator tree, the probe insertion points of the code may be calculated by generating an optimization map. The optimization map provides the insertion points of the probes to obtain full code coverage information while minimizing the number of probes inserted into the code. Once the probes are inserted, the binary of the code may be run to obtain the probe output data. The probe output data may then be overlaid onto the optimization map to associate the probe output data with the probe positions. Overlaying the probe output data with the optimization map resolves the probe output data with each probe's associated arc and blocks within the code to produce the code coverage data.

DETAILED DESCRIPTION

The present invention now will be described more fully hereinafter with reference to the accompanying drawings, which form a part hereof, and which show, by way of illustration, specific exemplary embodiments for practicing the invention. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Illustrative Operating Environment

Figure 1:
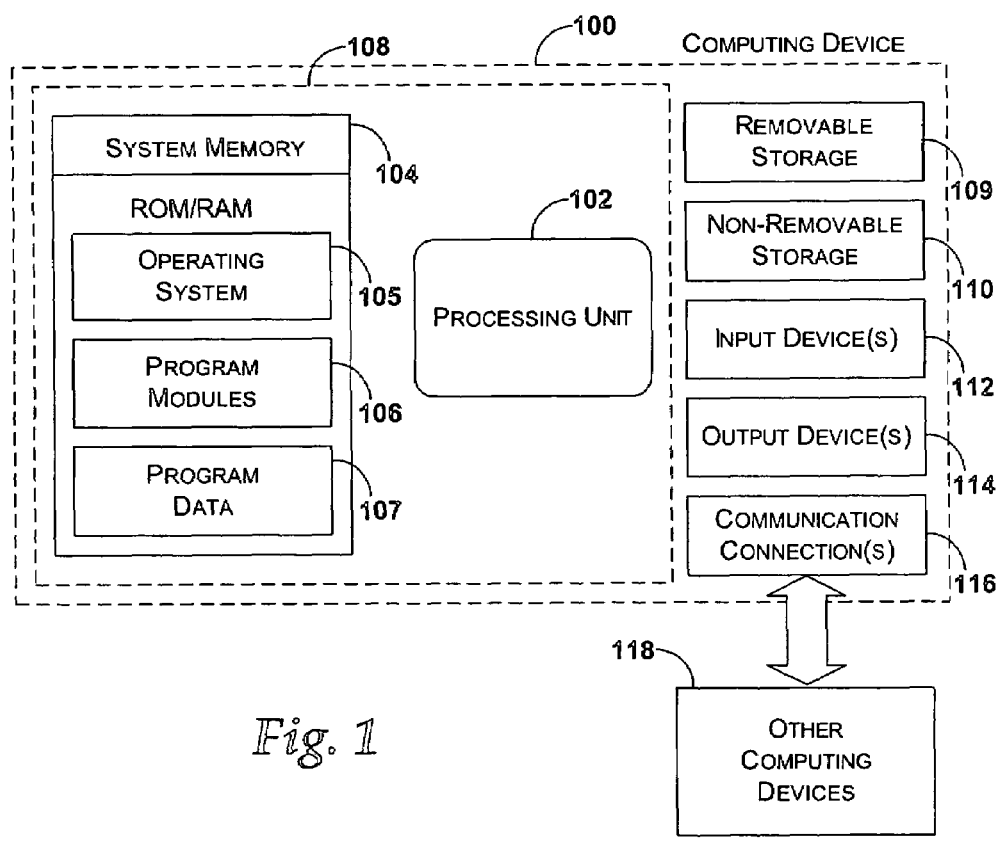
FIG. 1 illustrates an exemplary computing device that may be used in one exemplary embodiment of the present invention.

FIG. 1 shows an exemplary computing device that may be included in system 100 for implementing the invention. Computing device 100 illustrates a general operating environment that may apply to the present invention. In a very basic configuration, computing device 100 typically includes at least one processing unit 102 and system memory 104. Processing unit 102 includes existing physical processors, those in design, multiple processors acting together, virtual processors, and any other device or software program capable of interpreting binary executable instructions. Depending on the exact configuration and type of computing device, the system memory 104 may be volatile (such as RAM), non-volatile (such as ROM, flash memory, etc.) or some combination of the two. System memory 104 typically includes an operating system 105, one or more program modules 106, and may include program data 107. This basic configuration is illustrated in FIG. 1 by those components within dashed line 108.

Computing device 100 may also have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of computing device 100. Computing device 100 may also have input device(s) 112 such as keyboard, mouse, pen, stylus, voice input device, touch input device, etc. Output device(s) 114 such as a display, speakers, printer, etc. may also be included. All these devices are known in the art and need not be discussed at length here.

Computing device 100 may also contain communications connection(s) 116 that allow the device to communicate with other computing devices 118, such as over a network. Communications connection(s) 116 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Probe Optimization

The present invention is generally directed to a system and method for optimizing probe insertion when instrumenting a program. A probe refers to a set of instructions inserted into a program to retrieve data from the code, such as data regarding code coverage. A previous method for instrumenting a program involved inserting a probe for each arc of a control flow graph. However, a probe is a specified number of bits in length and adding a large number of probes to a program increases the overhead for instrumenting the program. When the program binary is run with the probes inserted, the probes may add a significant amount of time to the execution cycle of the binary. The present invention optimizes the probe insertion points, thereby reducing the number of probes inserted into the program and reducing overhead for instrumenting the program. With some program test suites taking weeks to execute, the reduction of overhead provided by the present invention may provide significant time savings.

Figure 2:
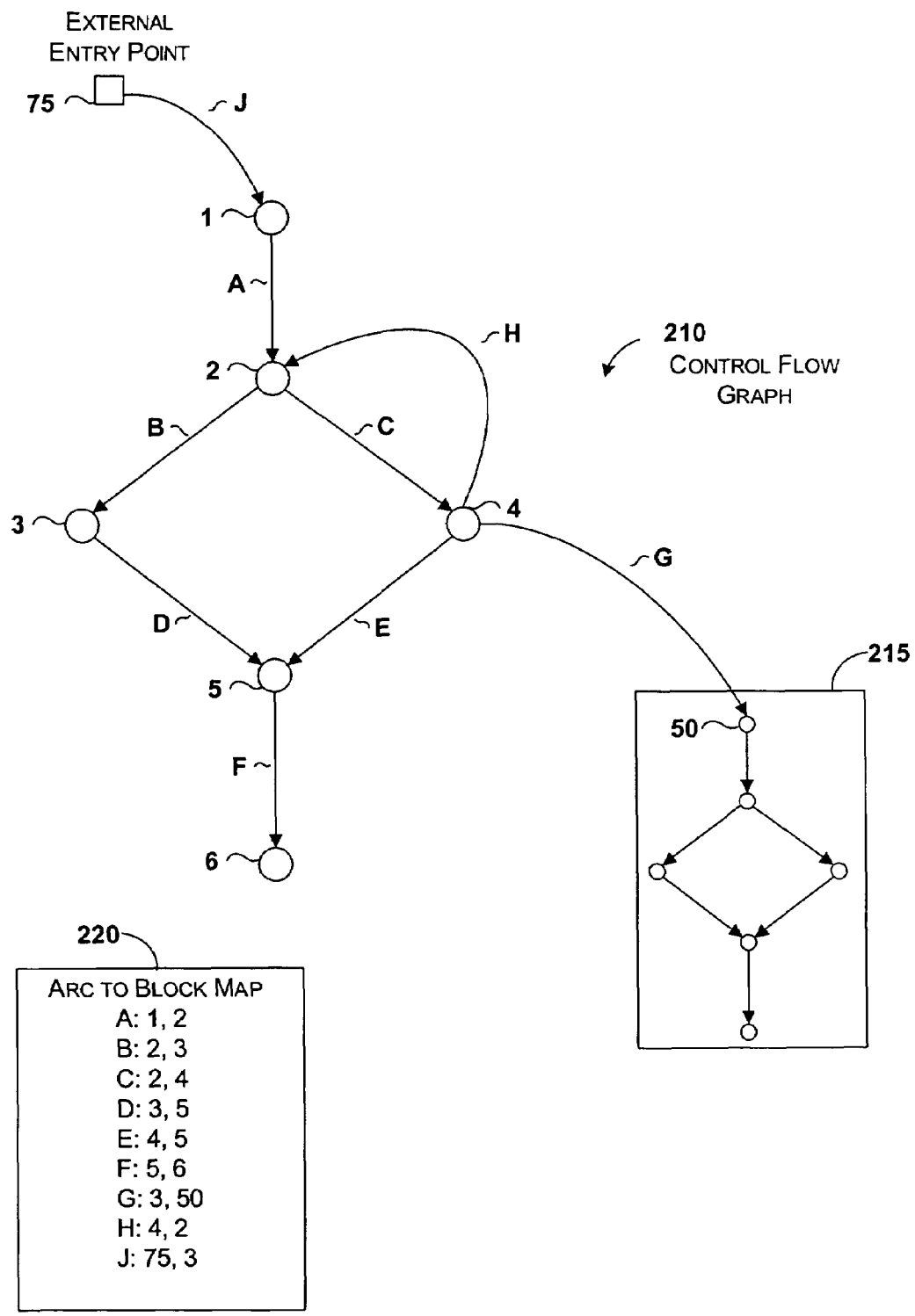
FIG. 2 illustrates an exemplary control flow graph and arc to block map, in accordance with the present invention.

FIG. 2 illustrates an exemplary control flow graph and arc to block map, in accordance with the present invention. Control flow graph 210 provides an illustration of the flow of execution of a program. The blocks, or nodes, (e.g., 1, 2, 3, 4, 5, 6) of the function are executed in the order as indicated by the arcs (e.g., A, B, C, D, E, F). Control flow graph 210 is one example of control flow calculated for a program, and other control flow graphs may be much more complex.

Control flow graph 210 may also be represented according to data entries representing the arcs and blocks rather than pictorially. An example is provided by arc to block map 220. Arc to block map 220 provides the block, or node, relationships for each arc within control flow graph 210. The blocks of code related to a particular path of processing for a program may be resolved by examining arc to block map 220.

In the example shown, execution of the program may take two different paths from node 1 to reach the end of the program at node 6. In one path, execution of blocks of code flows through arcs B and D, and in the other path, execution of blocks of code flows through arcs C and E. To obtain code coverage data for the program represented by control flow graph 210, the various paths available for execution of the program are considered. Also considered are other aspects of the program not included within the path from node 1 to node 6. For example, certain programs may have what is referred to as "back edges". A back edge is represent by arc H and corresponds to when a node has a codependent relationship with another node. Node 4 has a codependent relationship with node 2 due to the back edge. The back edge illustrates that for node 2 to execute, node 4 must execute. However, in the normal flow of execution, for node 4 to execute, node 2 must execute. Thus node 2 and node 4 have a codependent relationship generated by back edge H. In one embodiment for code coverage, back edges are probed because they represent processes outside the normal scope of the program.

Another aspect of consideration for the flow of the program is the existence of function calls, or calls to other portions of the program. A call is represented by arc G. The call corresponding to arc G calls to a node 50 and instructs function 215 to execute, and possibly return a value. In one embodiment for code coverage, calls to other portions of the program or other functions are usually probed, so that the code coverage data includes the calls.

Still another aspect of consideration for control flow of a program is external data entry points. For example, external entry point 75 provides data to node 1 across arc J. External entry points represents points of entry of data from an external source, such as input from a user, that a block of code (e.g., node 1) uses for execution.

In one embodiment for code coverage, external entry points are probed, so that the code coverage data includes these external entries of data.

Figure 3:
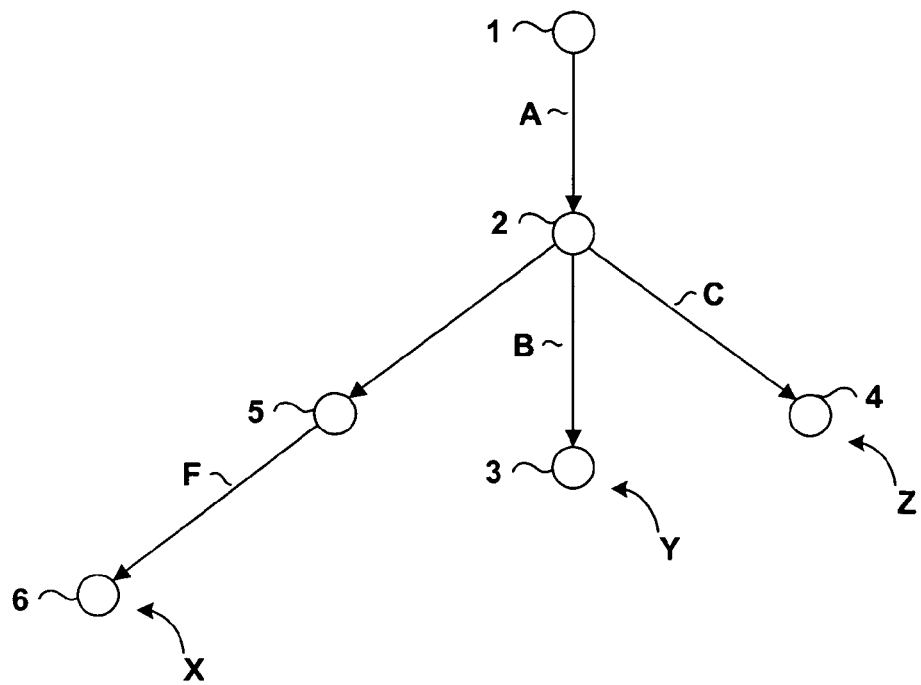
FIG. 3 illustrates an exemplary post-dominator tree and optimization map corresponding to the control flow graph and arc to block map of FIG. 2, in accordance with the present invention.
Figure 3:
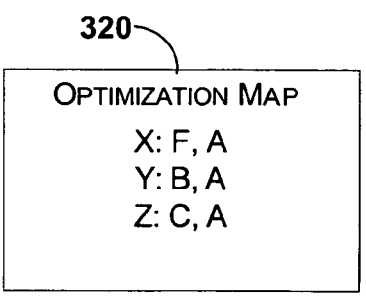
Figure 4:
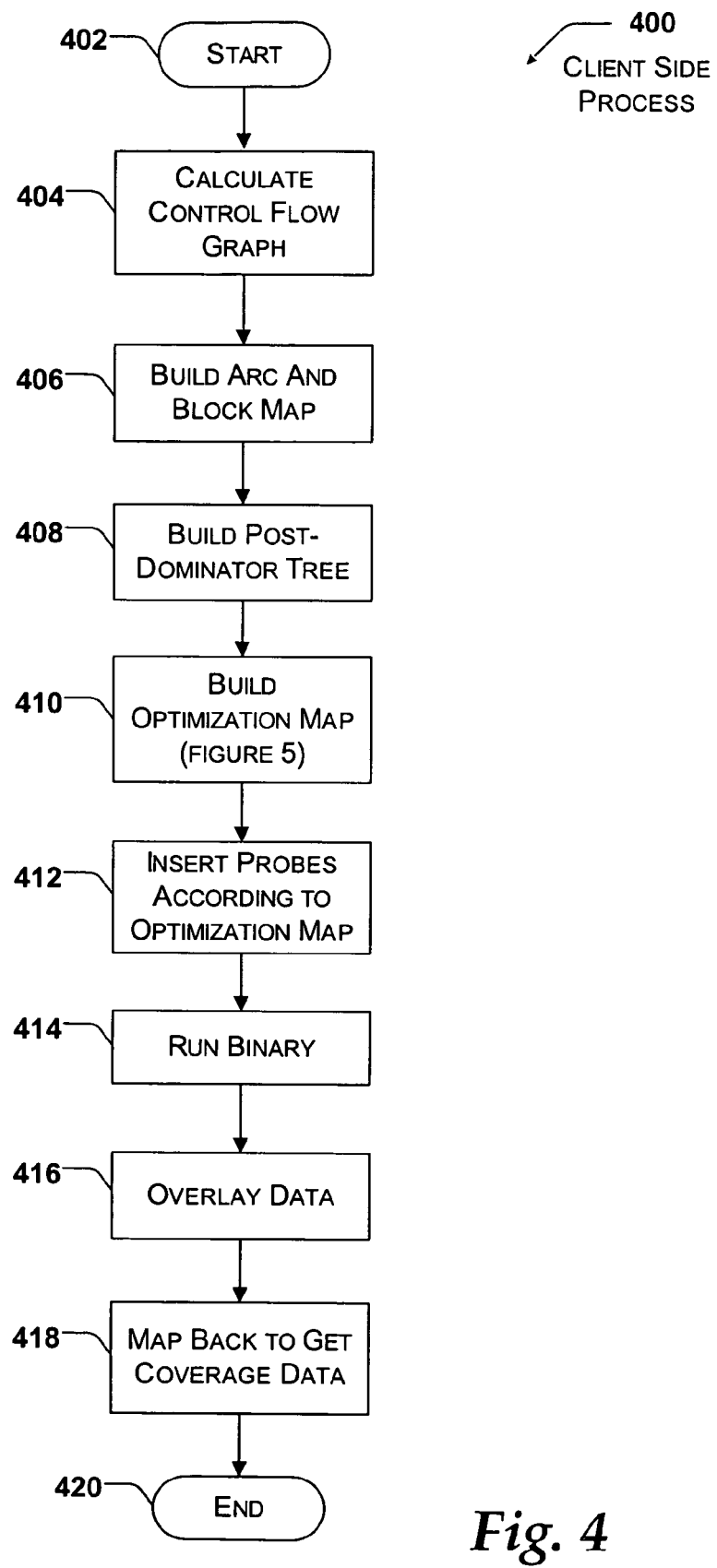
FIG. 4 illustrates an exemplary operational flow diagram for a process to instrument a program by optimally inserting probes into the program, in accordance with the present invention.
Figure 5:
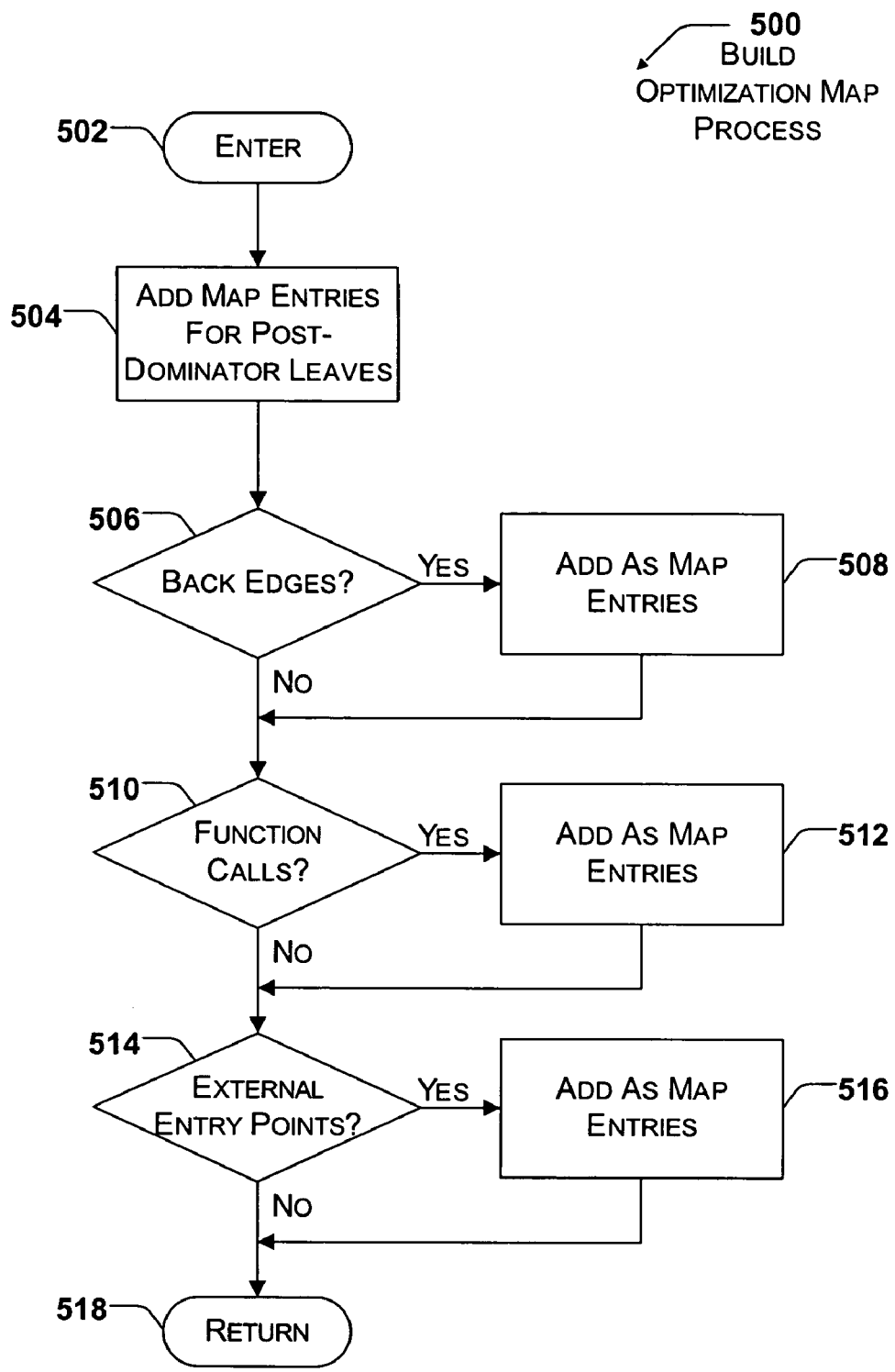
FIG. 5 illustrates an exemplary operational flow diagram for a process to build an optimization map, in accordance with the present invention.

Arc to block map 220 may be modified from additional passes through control flow graph 210 to include entries for back edges, calls, and external entry points. Accordingly, in one embodiment, optimization of the probe entries includes gathering full code coverage data while minimizing the number of probes used. FIGS. 3-5 below show a graphical method and processes for minimizing the number of probes used in instrumenting a program.

FIG. 3 illustrates an exemplary post-dominator tree and optimization map corresponding to the control flow graph and arc to block map of FIG. 2, in accordance with the present invention. Post-domination tree 310 illustrates the post-dominator relationship for blocks and their associated arcs within control flow graph 210 shown in FIG. 2. A post-dominator refers to a relationship between a first block of code and a second block of code. If the first block of code must execute before the second block of code can execute, the second block of code is referred to as the "post-dominator" of the first block of code. Correspondingly, in the same example, the first block of code is referred to as the "dominator" of the second block of code.

The calculation of the post-dominator tree provides a determination of blocks of code that are "leaves" within the post-dominator tree. Leaves refer to end points of the post-dominator tree, or nodes that have no children. Other blocks of code must execute for the leaf block to execute, but other blocks of code are not dependent on the execution of the leaf node. In the present example, post-dominator tree 310 includes three leaves: X, Y, and Z. Node 6 is a leaf because no other block of code depends in its execution. Nodes 3 and 4 are also leaves because these nodes do not necessarily execute before execution of the nodes (e.g., nodes 5 and 6) that follow nodes 3 and 4.

Once the leaves of a post-dominator tree are discovered, an optimization map is generated. An optimization map includes entries corresponding to the leaves of a post-dominator tree, and the arcs traversed though the post-dominator tree to reach the leaves. In the present example, optimization map 320 includes entries for the three leaf nodes (X, Y, Z) and their relationship with the arcs traversed (e.g., A, B, C, F) to reach each particular leaf node. Limiting probe insertion points to the points corresponding to the optimization map entries, rather than for every arc of associated with a program, optimizes the probe insertion for instrumenting the program.

In another embodiment, the probes calculated for the program are inserted into post-dominator tree 310. Inserting the probes into the post-dominator tree provides for a more compact mapping because if another probe is encountered as the parent nodes of the leaf node are traced, the mapping may cease. Accordingly, nodes and arcs already shown as covered by a probe are not also covered by another probe. The probes generated for back edges, calls, and external entry points may also be included in the tree for further refinement in mapping the nodes.

Despite that the arcs and block are referred to by letters and numbers respectively in FIGS. 2 and 3, other identifiers may be used, including all numbers, for distinguishing each arc and block.

FIG. 4 illustrates an exemplary operational flow diagram for a process to instrument a program by optimally inserting probes into the program, in accordance with the present invention. Process 400 starts at start block 402 where a program is selected for instrumentation. Processing continues at operational block 404.

At operational block 404, the control flow graph for the program is calculated. The control flow graph may be similar to the control flow graph shown in FIG. 2. Once the control flow graph is generated, processing proceeds to operational block 406.

At operational block 406, an arc to block map is built from the control flow graph. In one embodiment the arc to block map is similar to the arc to block map shown in FIG. 2. In another embodiment, the arc to block map are separate memory entries. Each memory entry lists all of the blocks and arcs corresponding to the program. In the memory entry for the blocks, the blocks corresponding to a particular arc are flagged as relating to that particular arc. In the memory entry for the arcs, each arc is flagged with its corresponding blocks. Accordingly, the arcs and blocks are cross-referenced such that obtaining information regarding coverage data for an arc or a block allows the coverage data for the related blocks and arcs to be resolved respectively. Processing continues at operational block 408.

At operational block 408, a post-dominator tree is built for the program. The post-dominator tree may be similar to the post-dominator tree shown in FIG. 3, or may be data representing a post-dominator tree. Once the post-dominator tree is calculated, processing moves to operational block 410.

At operational block 410, the optimization map corresponding to the post-dominator tree is built. The optimization map includes the entries for the leaves of the post-dominator tree. The optimization map also includes other entries for which probes are to be inserted into the program. A process for building the post-dominator tree is described in the discussion of FIG. 5 below. Once the optimization map is generated, processing moves to operational block 412.

At operational block 412, the probes corresponding to entries of the optimization map are inserted into the program. The number of probes inserted into the program has been optimized to reduce the number of probes while still providing code coverage data for the entire program. Processing continues at operational block 414.

At operational block 414, the binary representing the program with the probes inserted is run. While the program runs, the probes return data for which portions of the program have been utilized during the execution. Processing continues at operational block 416.

At operational block 416, while the binary is running or once the data has been returned from the probes, the returned data is overlaid onto the optimization map. Overlaying the data on the optimization map correlates the probes with the arcs of the program. Stated differently, the probes that return data signifying execution of code are matched with the arc associated with that probe using the optimization map. Once each probe has been associated with its associated arc by overlaying the optimization map, processing continues at operational block 418.

At operational block 418, each arc associated with each probe using the optimization map, is again mapped back to the associated blocks using the arc to block mapping. Accordingly, each probe associated with the respective blocks for which it is reporting execution of code. Mapping back to both the block level and the arc level gives the arc and block coverage data for the program. The arc and block coverage data provides the code coverage data for the program. Once the code coverage is provided, processing moves to end block 420, where process 400 ends.

FIG. 5 illustrates an exemplary operational flow diagram for a process to build an optimization map, in accordance with the present invention. Process 500 enters at enter block 502 where process 400 shown of FIG. 4 enters operational block 410. Processing continues at operational block 504.

At operational block 504, map entries are generated within the optimization map for the leaves of the post-dominator tree previously calculated. Each leaf of the post-dominator tree results in an entry within the optimization map. Correspondingly, each entry of the optimization map results in a probe that is inserted into the program. By inserting those probes the correlated to leaves of the post-dominator tree rather than probes that correlate to each arc of the control flow graph, the number of necessary probes is greatly reduced. Once the entries corresponding to the leaves of the post-dominator tree are generated in the optimization map, processing continues at decision block 506.

At decision block 506, another pass is made through the control flow of the program to determine whether back edges are present within the flow of execution of the code. As previously stated, back edges can create a codependency between two or more block of code within the program. If back edges are not present, processing advances to decision block 510. However, if back edges are present within the program, processing moves to operational block 508.

At operational block 508, entries are added to the optimization map that represent each of the back edges located within the execution flow of the program. The back edges represent process steps outside the normal flow of the program, and therefore are probed for coverage information. Adding the entries to the optimization map for each of the back edges ensures that coverage data is collected for each back edge discovered. After the entries are added, processing continues at decision block 510.

At decision block 510, another pass is made through the control flow of the program to determine whether any calls are present within the flow of execution of the code. The call may result in other functions or other portions of the code being executed. If no calls are present, processing advances to decision block 514. However, if calls are present within the program, processing moves to operational block 512.

At operational block 512, entries are added to the optimization map that represent each of the calls located within the execution flow of the program. The calls represent process steps outside the normal flow of the program, and therefore are probed for coverage information. Adding the entries to the optimization map for each of the calls ensures that coverage data is collected for each call discovered. After the entries are added, processing continues at decision block 514.

At decision block 514, another pass is made through the control flow of the program to determine whether any external entry points are present within the flow of execution of the code. In one embodiment, the external entry points are outside the normal execution paths of the code, and are not represented by leaves in the post dominator tree. If no external entry points are present, processing advances to return block 518, where process 500 returns to operational block 412 shown in FIG. 4. However, if external entry points are present with relation to the program, processing moves to operational block 516.

At operational block 516, entries are added to the optimization map that represent each of the external entry points located within the execution flow of the program. As previously stated, the external entry points represent process steps outside the normal flow of the program, and therefore are probed for coverage information. Adding the entries to the optimization map for each of the external entry points ensures that coverage data is collected for each external entry point discovered. After the entries are added, processing proceeds to end block 518, where process 500 returns to operational block 412 shown in FIG. 4.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for instrumenting a program, comprising:
   generating a post-dominator tree from a control flow graph associated with the program;
   building an arc to block map from the control flow graph, such that when data is received from a probe, the data is overlaid on the arc to block map to discover arc and block coverage data for the program;
   examining the post-dominator tree;
   building an optimization map according to the examination of the post-dominator tree, wherein the optimization map correlates probes to arcs and the building of the optimization map includes optimization map entries for calls;
   determining probe insertion points into the program according to the optimization map entries;
   inserting the probe into the program according to the probe insertion points;
   executing the program to obtain return probe data;
   determining executed arcs by correlating return probe data with the optimization map; and
   determining executed blocks form the executed arcs using the arc to block map.

2. The computer-implemented method of claim 1, further comprising examining the program for a back edge and adding an entry to the optimization map that corresponds to the back edge, such that a second probe insertion is made that corresponds to the location of the back edge in the program.

3. The computer-implemented method of claim 1, further comprising examining the program for an external entry point, and adding an entry to the optimization map that corresponds to the external entry point, such that a second probe insertion is made that corresponds to the location of the external entry point in the program.

4. The computer-implemented method of claim 1, further comprising overlaying data received from the probes onto the optimization map to determine an arc relationship for the probes, wherein the arc relationship provides code coverage data for the program.

5. The computer-implemented method of claim 1, wherein examining the post-dominator tree comprises determining leaf nodes that are present within the post-dominator tree.

6. A computer-readable storage medium that includes computer-executable instructions for performing a method for instrumenting a program, comprising:
   building an arc to block map from a control flow graph, such that when data is received from a probe, the data is overlaid on the arc to block map to discover arc and block coverage data for the program;
   generating a post-dominator tree associated with the program;
   building an optimization map that corresponds to the post-dominator tree, wherein the optimization map correlates probes to arcs and the building of the optimization map includes optimization map entries for calls
   determining probe insertion points into the program according to the optimization map entries
   inserting probes into the program according to the probe insertion points;
   executing the program to obtain return probe data;
   determining executed arcs by correlating return probe data with the optimization map; and
   determining executed blocks from the executed arcs using the arc to block map.

7. The computer-readable storage medium of claim 6, further comprising generating the post-dominator tree from a control flow graph associated with the program.

8. The computer-readable storage medium of claim 6, further comprising examining the program for back edges and adding entries to the optimization map that correspond to the back edges, such that some of the probes inserted into the program are inserted corresponding to the locations of the back edges in the program.

9. The computer-readable storage medium of claim 6, further comprising examining the program for external entry points and adding entries to the optimization map that correspond to the external entry points, such that some of the probes inserted into the program are inserted corresponding to the locations of the external entry points in the program.

10. A system for instrumenting a program, comprising: a computing device that includes an application that is configured to:
   calculate a control flow graph corresponding to the program;
   build an arc to block map from the control flow graph, such that when data is received from a probe, the data is overlaid on the arc to block map to discover arc and block coverage data for the program;
   build a post-dominator tree that corresponds to the control flow graph;
   build an optimization map that corresponds to the post-dominator tree, wherein the optimization map correlates probes to arcs and the building of the optimization map includes optimization map entries for calls;

determine probe insertion points into the program according to the optimization map entries;

insert the probes into the program according to the probe insertion points;

execute the program to obtain return probe data;

determine executed arcs by correlating return probe data with the optimization maps; and determine executed blocks from the executed arcs using the arc to block map.

11. The system of claim 10, wherein the application is further configured to examine the program for a back edges and adding entries to the optimization map that corresponds to the back edges, such that some of the probes inserted into the program are inserted corresponding to the locations of the back edges in the program.

12. The system of claim 10, wherein the application is further configured to examine the program for external entry points and adding an entries to the optimization map that correspond to the external entry points, such that some of the probes inserted into the program are inserted corresponding to the locations of the external entry points in the program.

13. The system of claim 10, wherein the probes are included into the post-dominator tree such that duplication of probe mapping to arcs and blocks of code is prevented.

* * * * *

UNITED STATES PATENT AND TRADEMARK OFFICE
CERTIFICATE OF CORRECTION

PATENT NO.       : 7,590,521 B2                          Page 1 of 1
APPLICATION NO.  : 10/819463
DATED            : September 15, 2009
INVENTOR(S)      : Kenneth Kai-Baun Ma et al.

It is certified that error appears in the above-identified patent and that said Letters Patent is hereby corrected as shown below:

In column 7, line 64, in Claim 1, delete "form" and insert -- from --, therefor.

Signed and Sealed this
Fifteenth Day of February, 2011

David J. Kappos
*Director of the United States Patent and Trademark Office*

UNITED STATES PATENT AND TRADEMARK OFFICE
CERTIFICATE OF CORRECTION

PATENT NO. : 7,590,521 B2
APPLICATION NO. : 10/819463
DATED : September 15, 2009
INVENTOR(S) : Ma et al.

Page 1 of 1

It is certified that error appears in the above-identified patent and that said Letters Patent is hereby corrected as shown below:

In column 7, line 59, in Claim 1, before "into" delete "probe" and insert -- probes --, therefor.

In column 8, line 32, in "Claim 6, delete "entries" and insert -- entries; --, therefor.

In column 9, line 9, in Claim 10, delete "maps;" and insert -- map; -- therefor.

In column 9, line 13, in Claim 11, delete "a back" and insert -- back --, therefor.

In column 9, line 14, in Claim 11, delete "corresponds" and insert -- correspond --, therefor.

In column 10, line 6, in Claim 12, delete "an entries" and insert -- entries --, therefor.

Signed and Sealed this
Fifteenth Day of March, 2011

David J. Kappos
*Director of the United States Patent and Trademark Office*